(12) United States Patent
Gloss et al.

(10) Patent No.: US 10,344,940 B2
(45) Date of Patent: Jul. 9, 2019

(54) OPTICAL SYSTEM FOR A MOTOR VEHICLE FOR LIGHTING UNDER CONDITIONS OF REDUCED VISIBILITY, ESPECIALLY UNDER THE CONDITIONS OF FOG, HEAVY RAIN OR SNOWFALL

(71) Applicant: Varroc Lighting Systems, s.r.o., Senov u Noveho Jicina (CZ)

(72) Inventors: Tomas Gloss, Vitkov (CZ); Jakub Hruska, Hlucin (CZ)

(73) Assignee: Varroc Lighting Systems, S.R.O., Senov U Noveho (CZ)

( * ) Notice: Subject to any disclaimer, the term of this patent is extended or adjusted under 35 U.S.C. 154(b) by 0 days.

(21) Appl. No.: 16/053,037

(22) Filed: Aug. 2, 2018

(65) Prior Publication Data
US 2019/0041022 A1 Feb. 7, 2019

(30) Foreign Application Priority Data

Aug. 4, 2017 (CZ) .................................... 2017-452

(51) Int. Cl.
*F21S 43/20* (2018.01)
*F21S 43/40* (2018.01)
(Continued)

(52) U.S. Cl.
CPC .............. *F21S 43/26* (2018.01); *B60Q 1/20* (2013.01); *F21S 43/14* (2018.01); *F21S 43/31* (2018.01); *F21S 43/315* (2018.01); *F21S 43/40* (2018.01)

(58) Field of Classification Search
CPC . F21S 43/26; F21S 43/31; F21S 43/40; B60Q 1/20
See application file for complete search history.

(56) References Cited

U.S. PATENT DOCUMENTS

2007/0019429 A1\* 1/2007 Gasquet .................. F21V 5/045
362/510
2010/0039819 A1 2/2010 Fournier et al.
2017/0211775 A1 7/2017 Potter et al.

FOREIGN PATENT DOCUMENTS

DE      19951407 A1    5/2001
EP       0322370 A1    6/1989
(Continued)

OTHER PUBLICATIONS

Search Report from Corresponding Application CZ PV 2017-452 dated Apr. 27, 2018 (3 pages).

*Primary Examiner* — Thomas M Sember
(74) *Attorney, Agent, or Firm* — Hovey Williams LLP (57) ABSTRACT

The optical system comprises an optical component with an active part (1) made of an optically transparent material, a collimating element (2) and a light unit (3) to emit light rays (10) to the collimating element (2) to collimate light rays (10) and to direct them to the active part (1). Generally, the active part (1) has an output surface (12) on its front side for the output of light rays (10) out of the active part (1) towards the display surface (ZY) situated at a distance in front of the active part (1). Furthermore, the active part (1) comprises optical elements (13) whose output surfaces (15) are part of the output surface (12) to create light patterns (A) on the display surface (ZY). The optical elements (13) consist of convergent lenses (13*a*) and/or divergent lenses (13*b*), the optical elements (13) being arranged after each other in rows situated next to each other.

13 Claims, 13 Drawing Sheets

(51) Int. Cl.
*F21S 43/31* (2018.01)
*B60Q 1/20* (2006.01)
*F21S 43/14* (2018.01)

(56) References Cited

FOREIGN PATENT DOCUMENTS

| | | |
|---|---|---|
| EP | 0404990 A1 | 1/1991 |
| GB | 2041189 A | 9/1980 |
| WO | 0214738 A1 | 2/2002 |

\* cited by examiner

OPTICAL SYSTEM FOR A MOTOR VEHICLE FOR LIGHTING UNDER CONDITIONS OF REDUCED VISIBILITY, ESPECIALLY UNDER THE CONDITIONS OF FOG, HEAVY RAIN OR SNOWFALL

RELATED APPLICATIONS

This application claims the priority benefit of Czech Patent Application No. PV 2017-452 entitled "AN OPTICAL SYSTEM FOR A MOTOR VEHICLE FOR LIGHTING UNDER CONDITIONS OF REDUCED VISIBILITY, ESPECIALLY UNDER THE CONDITIONS OF FOG, HEAVY RAIN OR SNOWFALL," filed Aug. 4, 2017, the entire disclosure of which is incorporated herein by reference.

FIELD OF THE INVENTION

The invention belongs to the field of arrangement of optical signaling devices of motor vehicles and relates to an optical system designed to ensure the required emission characteristics of the light trace for lighting under conditions of reduced visibility.

BACKGROUND INFORMATION

Currently, motor vehicles are equipped with signal lamps designed to emit a light beam during reduced visibility conditions, e.g., in case of fog or heavy rain. Such signal lamps can be integrated in the body as separate lighting elements or they can be an integral part of headlights and tail lights in the form of a partial lighting unit. Lighting units for fog lights provide a short light ray of the white or red color, which helps to light through fog, heavy rain or snowfall. The front/white fog light illuminates the space directly in front of the vehicle while the red/rear fog light enhances road traffic safety, helping to improve visibility of the respective vehicle for the other participants of road traffic.

The patent documents EP0322370, GB2041189B, EP0404990, and DE19951407 disclose designs of rear fog lamps comprising an assembly of various optical elements, e.g., in the form of a ball lens, Fresnel lens, reflective surfaces, prisms, collimators etc., the resulting light pattern/trace with a rhombic shape being composed on the display surface by means of individual optical elements. Each optical element directs light rays to a certain partial area of the resulting light trace and creates a partial pattern. A disadvantage of the prior art is the fact that to arrange the light beam to a rhombic shape and to meet photometric requirements, very powerful light sources must be used, which is consequently manifested by higher financial costs. Another disadvantage is the fact that if the light trace consists of partial patterns, a small production defect of a partial optical element is manifested in the final light trace where the partial pattern corresponding to the defective optical element will be deformed.

The object of the invention is to design an optical system for motor vehicles adapted to create a light beam for lighting at a reduced visibility that has low requirements for installation in the vehicle body, ensures high efficiency of the optical system and enables to create a light pattern of an approximately rhombic shape on the display surface by means of optical elements.

SUMMARY OF THE INVENTION

The above mentioned objects of the invention are fulfilled by an optical system according to the invention for a motor vehicle for lighting under conditions of reduced visibility, especially conditions of fog, heavy rain or snowfall, comprising an optical component with an active part made of an optically transparent material, a collimating element and a light unit to emit light rays to the collimating element to collimate light rays and to direct them to the active part, wherein the active part has an output surface on its front side for the output of light rays out of the active part towards the display surface situated at a distance in front of the active part and comprises optical elements whose output surfaces are part of the output surface to create light patterns on the display surface. The optical elements consist of convergent lenses and/or divergent lenses, the optical elements being arranged after each other in rows situated next to each other.

In the front view of the output surface, the output surface advantageously covers the whole front side of the active part.

The output surfaces of the optical elements advantageously have a rhombic shape in the front view of the output surface. The longer diagonals of the rhombi that the output surfaces of the lenses are shaped into in the front view of the output surface lie on horizontal planes passing through the optical centers of the lenses.

The active part of the optical component can comprise exclusively spherical lenses, or exclusively aspherical lenses or a combination of spherical and aspherical lenses.

The active part of the optical component can comprise exclusively convergent lenses, or exclusively divergent lenses or a combination of convergent and divergent lenses.

In one of preferred embodiments, all the optical elements have the same shape of the perimeter, the same size in the front view of the output surface. All the lenses whose output surfaces the elements are composed of advantageously have the same focal distance.

In one of preferred embodiments, the convergent and divergent lenses are arranged in a chessboard pattern in the active part.

In one of preferred embodiments, the active part of the optical component has a plate-like shape while it can generally have the shape of a planar plate or convex plate or concave plate.

The active part and the collimating element may form an integral body, or they may be independent, spatially separated bodies.

If the active part and the collimating element are independent, spatially separated bodies, the collimating element may be a parabolic reflector.

BRIEF DESCRIPTION OF DRAWINGS

The invention will be clarified in a more detailed way with the use of its embodiment examples with references to attached drawings, where.

EXAMPLES OF EMBODIMENTS OF THE INVENTION

Figure 1:
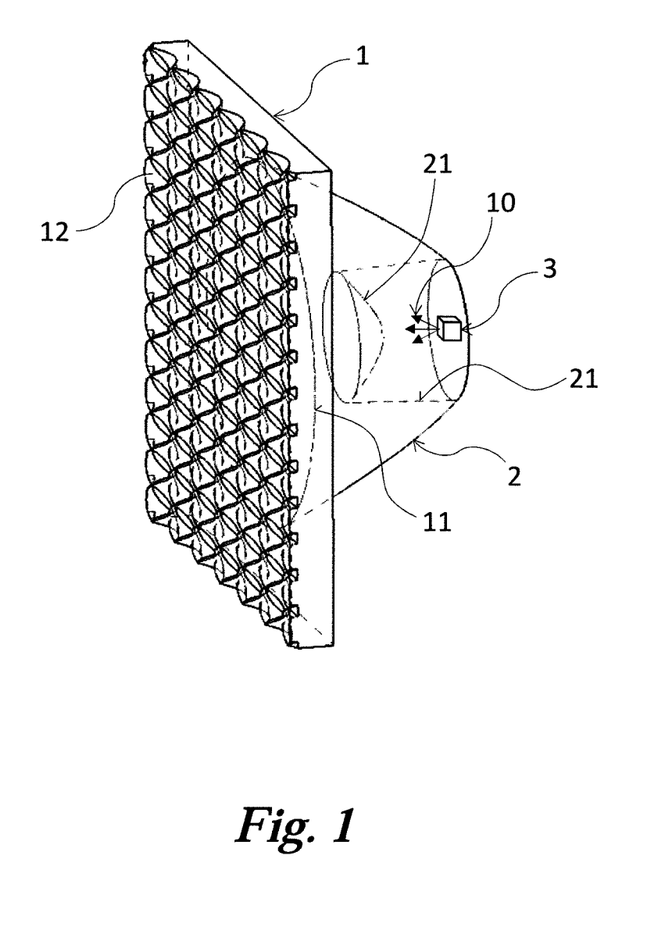
FIG. 1 is an axonometric view of the front side of an embodiment example of the optical system.
Figure 2:
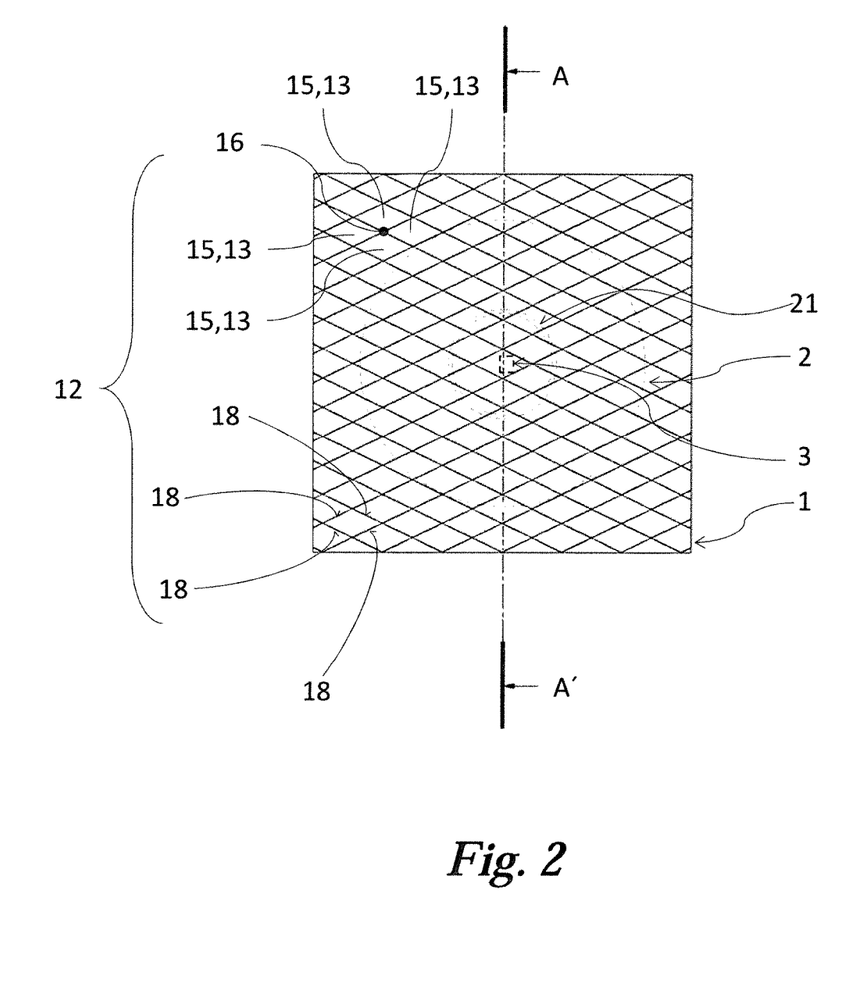
FIG. 2 is a front view of the optical system of FIG. 1.
Figure 3:
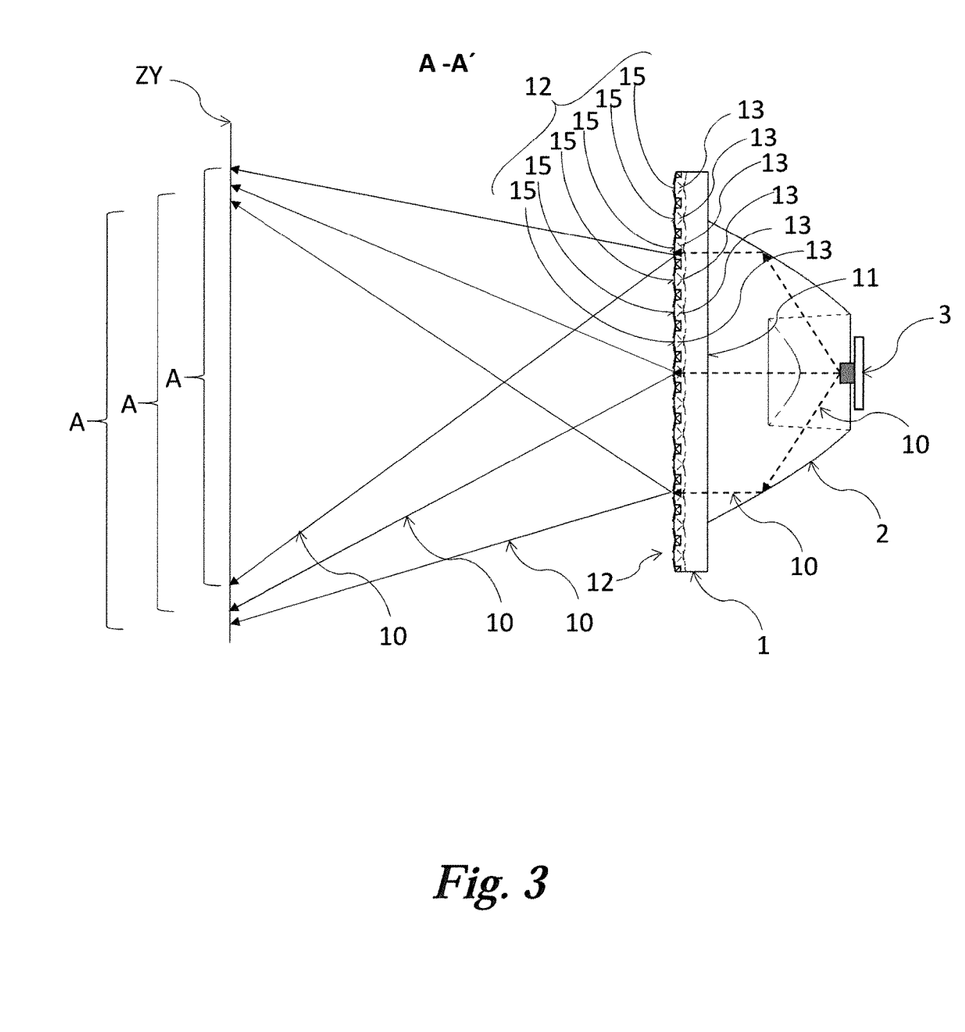
FIG. 3 is a view in the longitudinal section A-A' of the optical system of FIG. 2.

FIGS. 1, 2 and 3 show an embodiment example of an optical system according to the present invention that comprises at least one optical component with an active part 1 made of an optically transparent material with an associated collimating element 2 and a light unit 3 to emit light rays 10 into the collimating element 2.

In the embodiment example shown in FIGS. 1 to 3, the complete optical component consists of the active part 1, but generally it does not have to be the case and within the invention there may be embodiments wherein the active part, i.e., the part fitted with optical elements 13, only represents a certain part of the optical component.

The optical part and collimating element 2 of FIGS. 1 to 3 form an integral body. The collimating element 2 comprises a central recess for efficient binding of light rays 10 from the light unit 3 to the body of the collimating element 2. One recess contains two binding input surfaces 21 to bind most light rays 10 emitted by the light unit 3. The collimating element 2 comprises a central lens to bind and collimate the central part of the emitted light rays 10 on the one hand, further a lateral wall of the recess to bind the marginal part of the emitted light rays 10 as well as a lateral reflective surface to collimate the light rays 10 bound through the lateral wall of the recess. The optical component 1 comprises on its front side a macroscopically shaped output surface 12 for the output of the light rays 10 passing through the active part 1 out of the active part 1 of the optical component and on its rear side an input surface 11 for the input of the light rays 10 collimated by the collimating element 2 into the inner structure of the active part 1 of the optical component. The active part 1 comprises optical elements 13 arranged on its output surface 12, e.g. consisting of convergent lenses 13a and/or divergent lenses 13b adapted to produce rhombic light patterns A on the display surface ZY, individual light patterns A overlapping each other on the display surface ZY. Each optical element 13 comprises an output surface 15 the perimeter of which consists of the margins 18 while the four displayed optical elements 13 meet at a common contact point 16.

Figure 4:
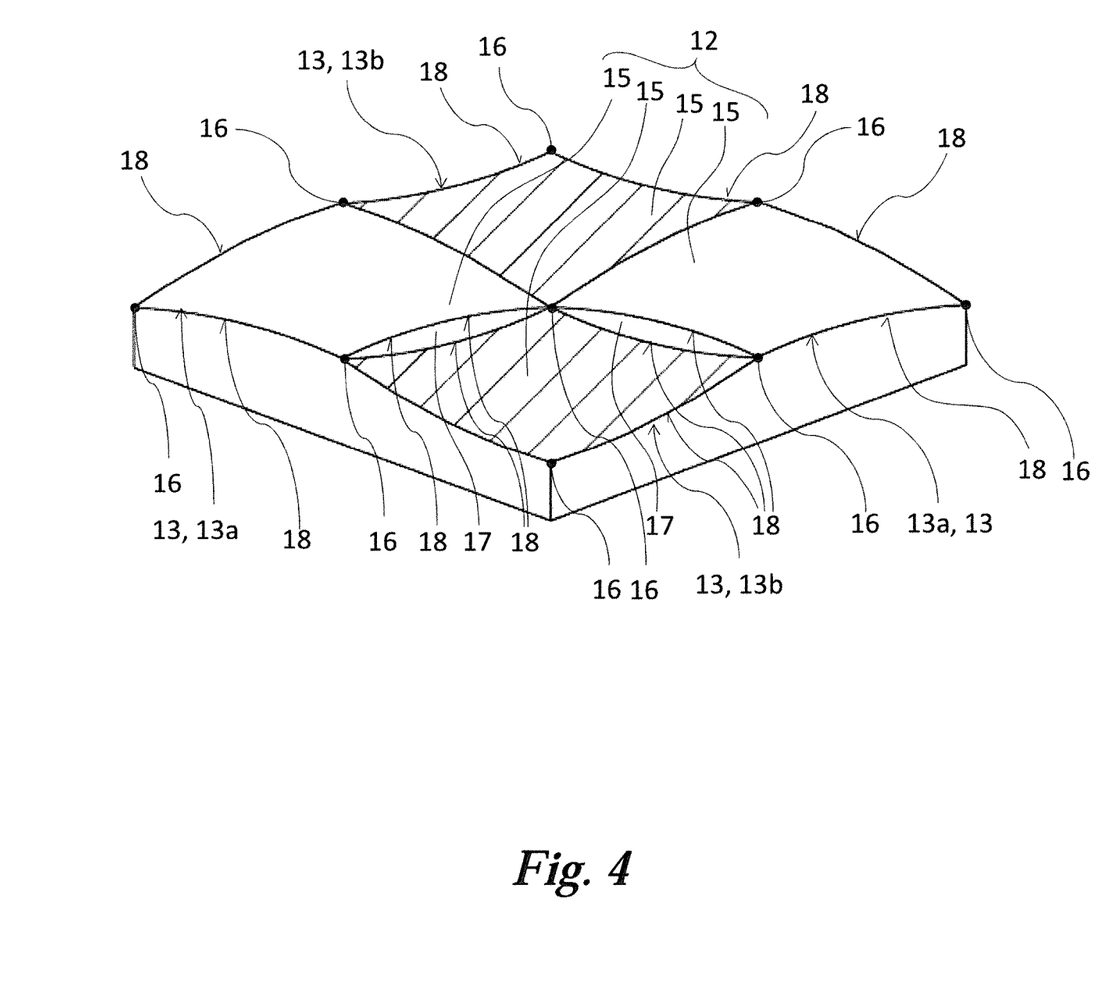
FIG. 4 is an axonometric view of an arrangement example of the optical elements of the optical system.

FIGS. 4 to 7 show parts of an embodiment example of the optical system according to the invention comprising convergent lenses 13a and divergent lenses 13b arranged in a chessboard pattern wherein an inactive surface 17 is created between each adjacent part of a convergent and divergent lens 13a, 13b (see FIG. 4).

Figure 5:
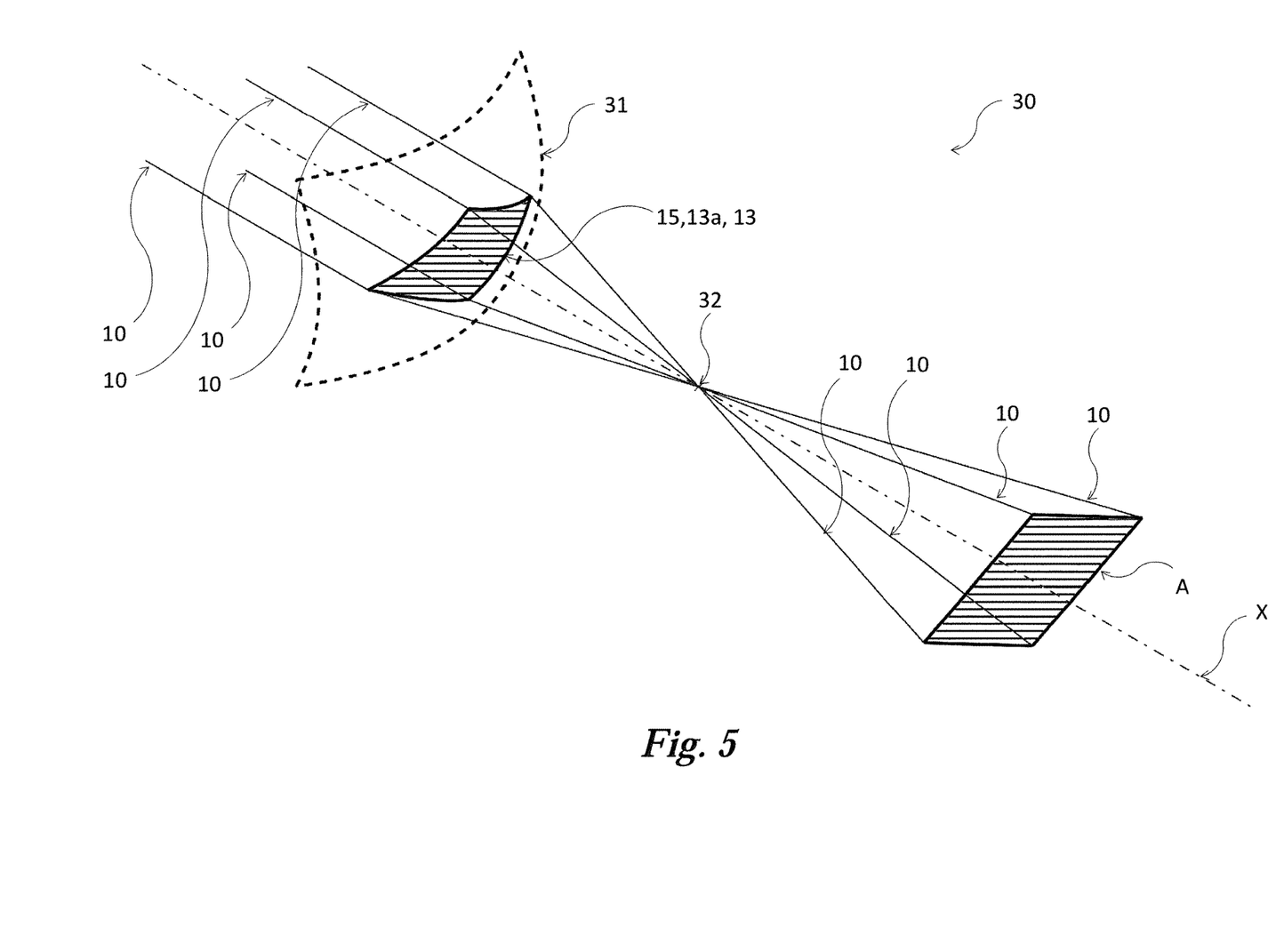
FIG. 5 is a perspective view of an output surface of a convergent lens and the light pattern produced by it.

FIG. 5 presents a perspective view of an output surface 15 of a convergent lens 13a and the light pattern A of the optical system 30 produced by it. A convergent lens 13a is obtained by peripheral trimming of a converging lens 31 in such a way that in a front view the convergent lens 13a should have a rhombic shape of its circumference. This means that the output surface 15 is a part of the outer surface of a converging lens 31 and collimated light rays 10 fall onto it. A lens 31, i.e., also a convergent lens 13a, directs light rays 10 to the focal point 32. The said shape of the convergent lens 13a produces the light pattern A, having a rhombic shape, on the display surface ZY.

Figure 6:
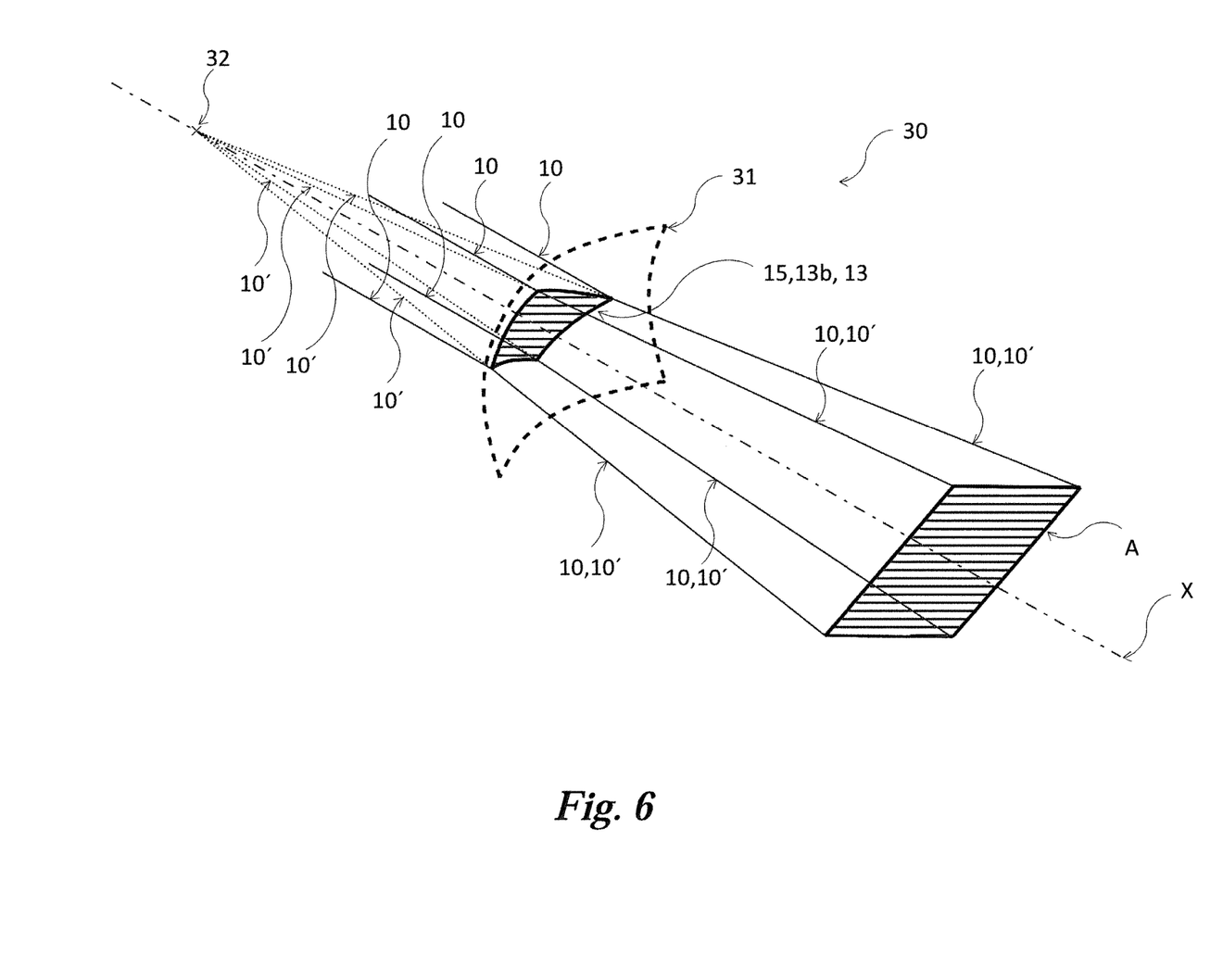
FIG. 6 is a perspective view of an output surface of a divergent lens and the light pattern produced by it.

FIG. 6 shows a perspective view of an output surface of a divergent lens 13b and the light pattern A produced by it within the optical system 30. A divergent lens 13b is obtained by peripheral trimming of a diverging lens 31 in such a way that in a front view the divergent lens 13b should have a rhombic shape of its circumference. This means that the output surface 15 is a part of the outer surface of a diverging lens 31 and collimated light rays 10 fall onto it. A divergent lens 13b deflects light rays 10 when the trajectory of previously collimated light rays 10 corresponds to the trajectory of imaginary light rays 10' emitted from the virtual focal point 32 of the lens 31.

Figure 7:
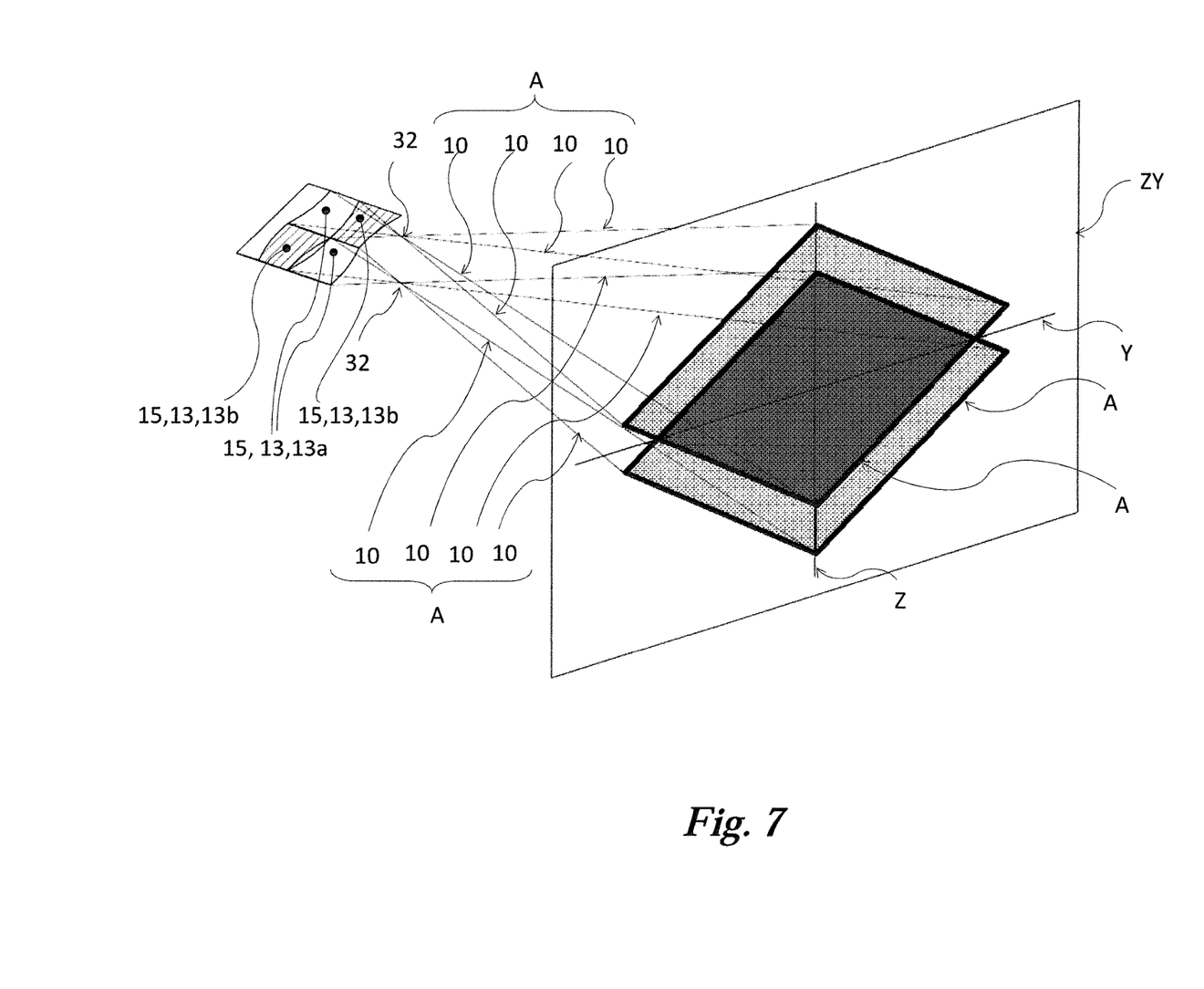
FIG. 7 is a view of the output surfaces of convergent and divergent lenses arranged in a chessboard pattern and of the light patterns on the display surface produced by two convergent lenses.

FIG. 7 shows light patterns A generated by two convergent lenses 13a. The light patterns A partly overlap each other on the display surface ZY.

Figure 8:
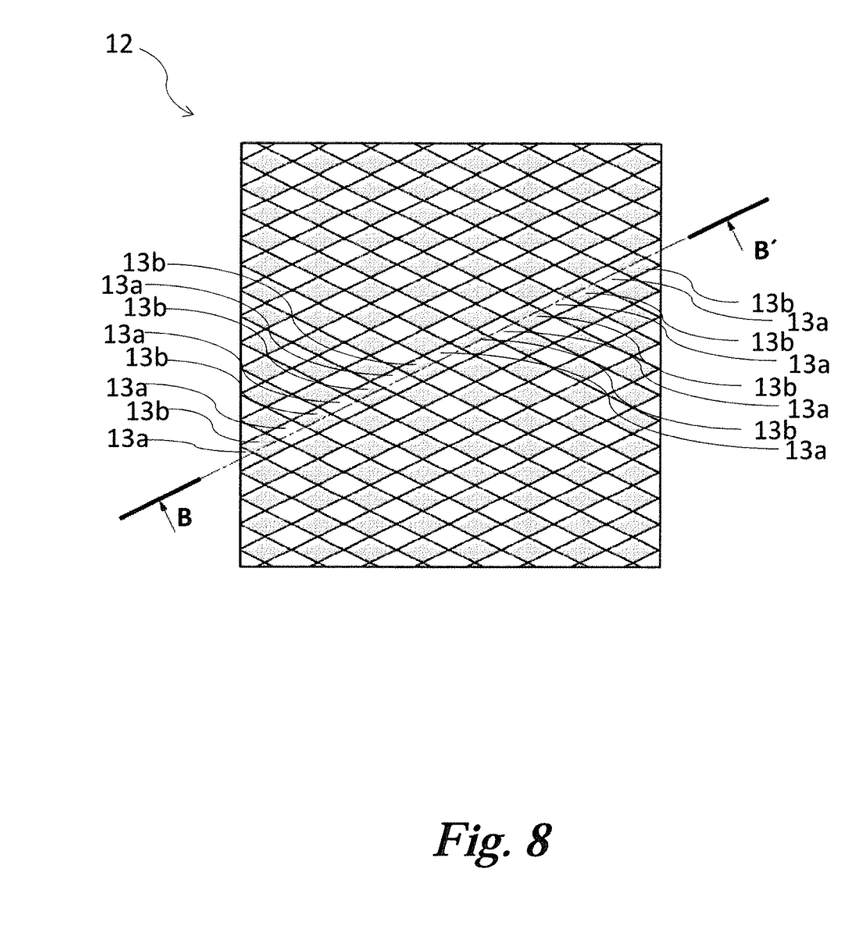
FIG. 8 is a front view of the output surface of an embodiment example of the active part of the optical component with convergent lenses and divergent lenses arranged in a chessboard pattern.
Figure 9:
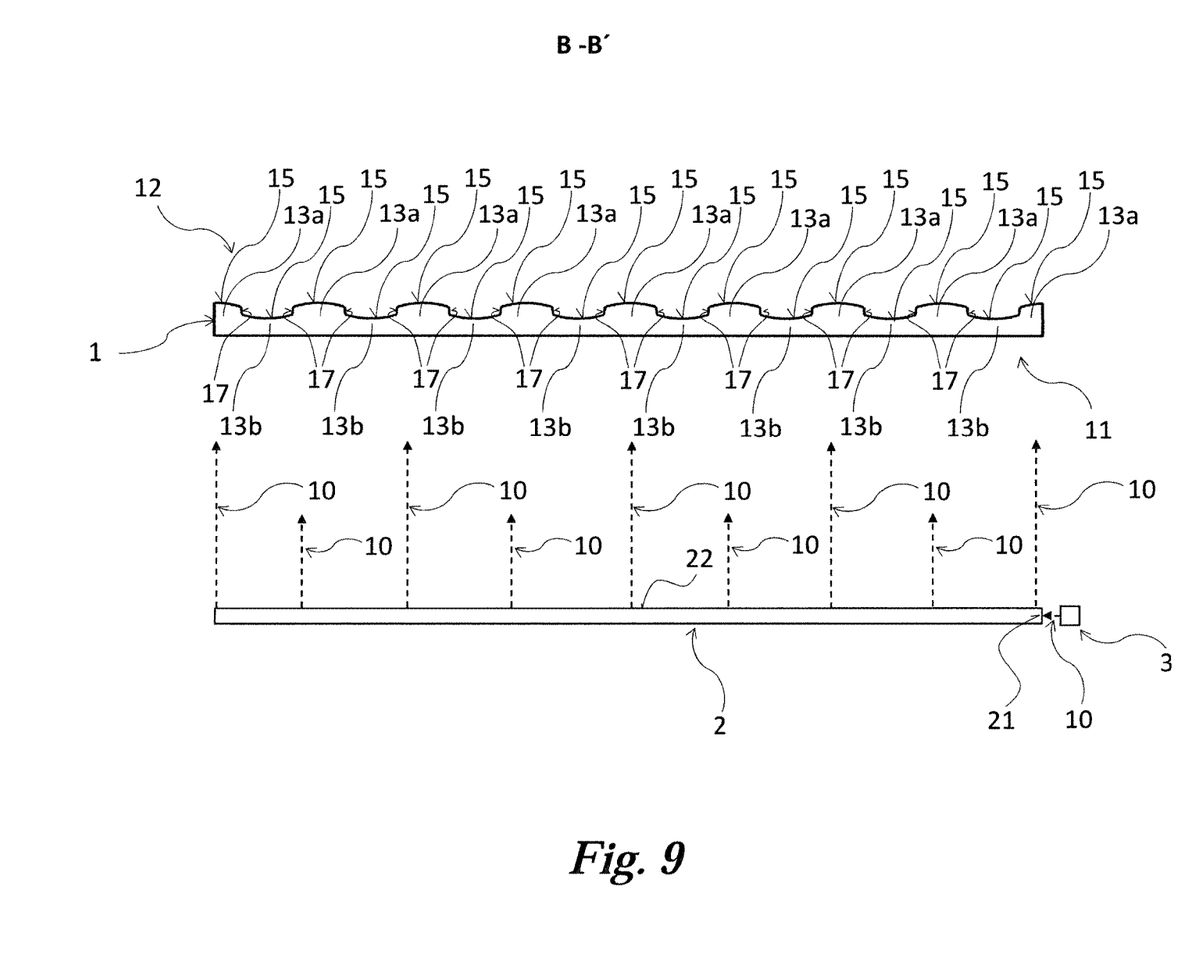
FIG. 9 is a view in the longitudinal section B-B' of the optical system of FIG. 8.

FIGS. 8 and 9 show an embodiment example wherein the output surface of the active part 1 of the optical component comprises convergent lenses 13a and divergent lenses 13b arranged in a chessboard pattern. The active part 1 of the optical component and the collimating element 2 are independent, spatially separated bodies wherein the output surface 22 of the collimating element 2 is separated from the input surface 11 of the active part 1 with free space. The collimating element 2 is designed as a light guide.

Figure 10:
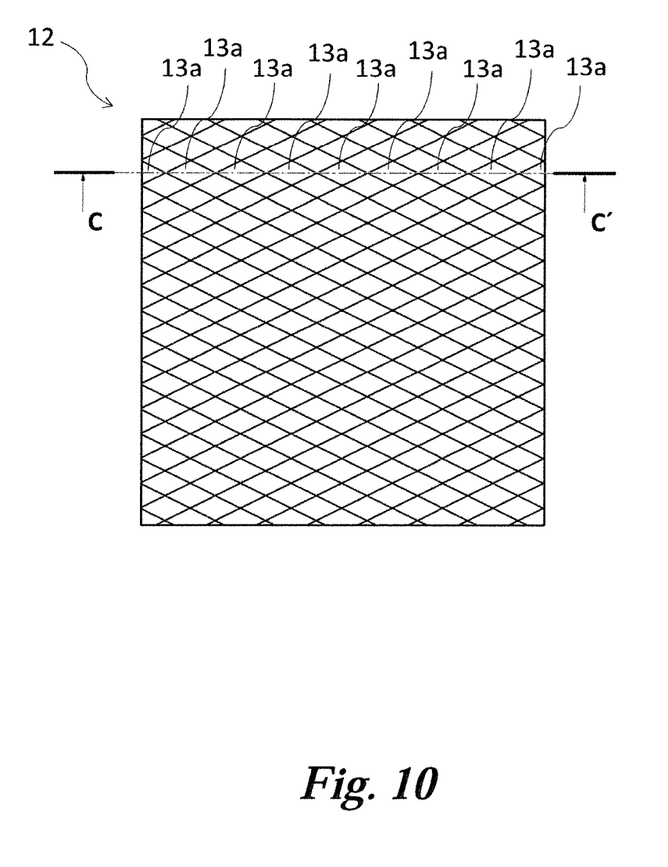
FIG. 10 is a front view of the output surface of an embodiment example of the active part of the optical component comprising convergent lenses.
Figure 11:
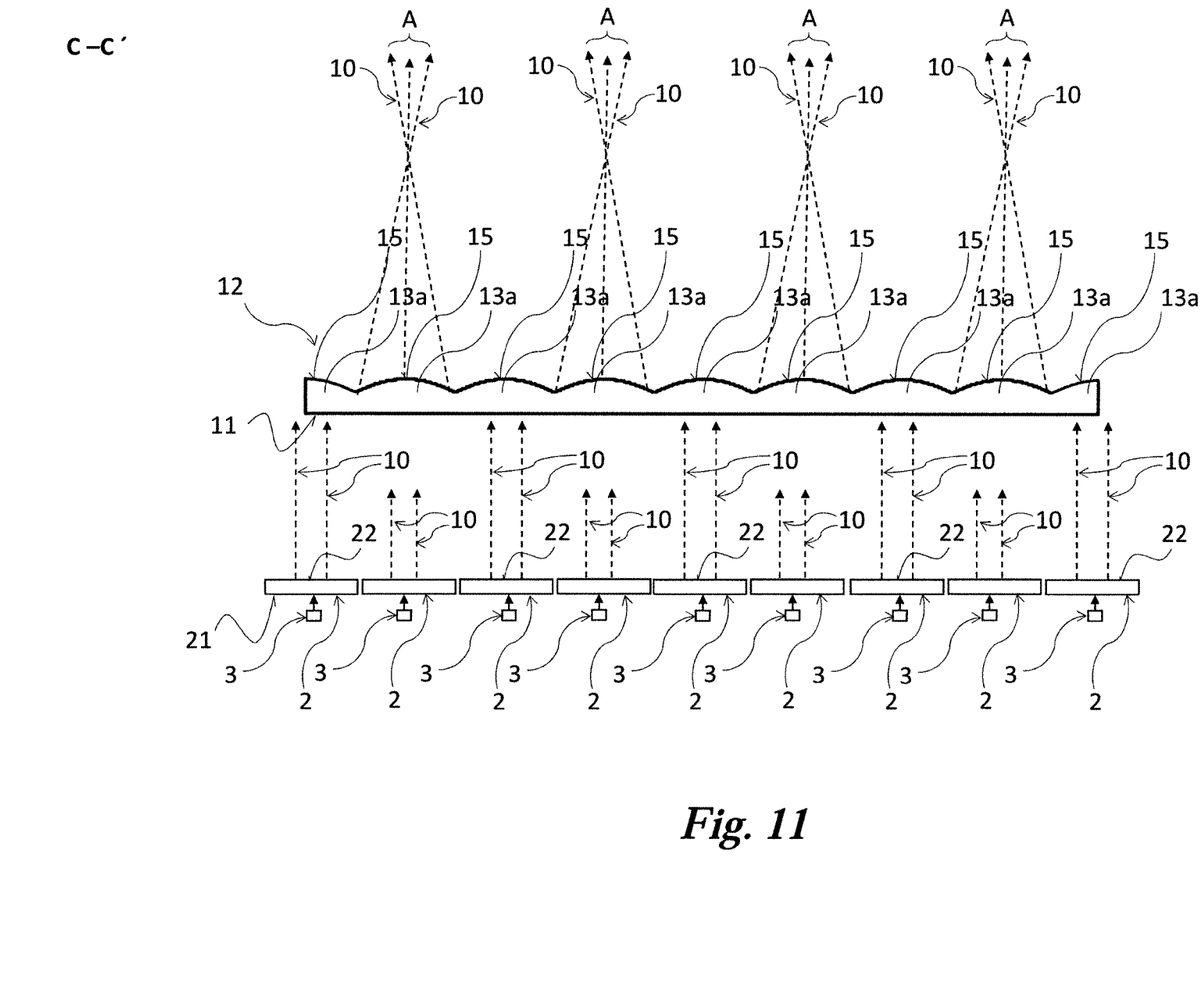
FIG. 11 is a view in the longitudinal section C-C' of the optical system of FIG. 10.

FIGS. 10 and 11 show another exemplary embodiment wherein the active part 1 of the optical component comprises on its output surface 12 optical elements 13 arranged next to each other and designed as convergent lenses 13a. Light rays 10 are generated by the system of light units 3 and collimated by the system of collimating elements 2.

Figure 12:
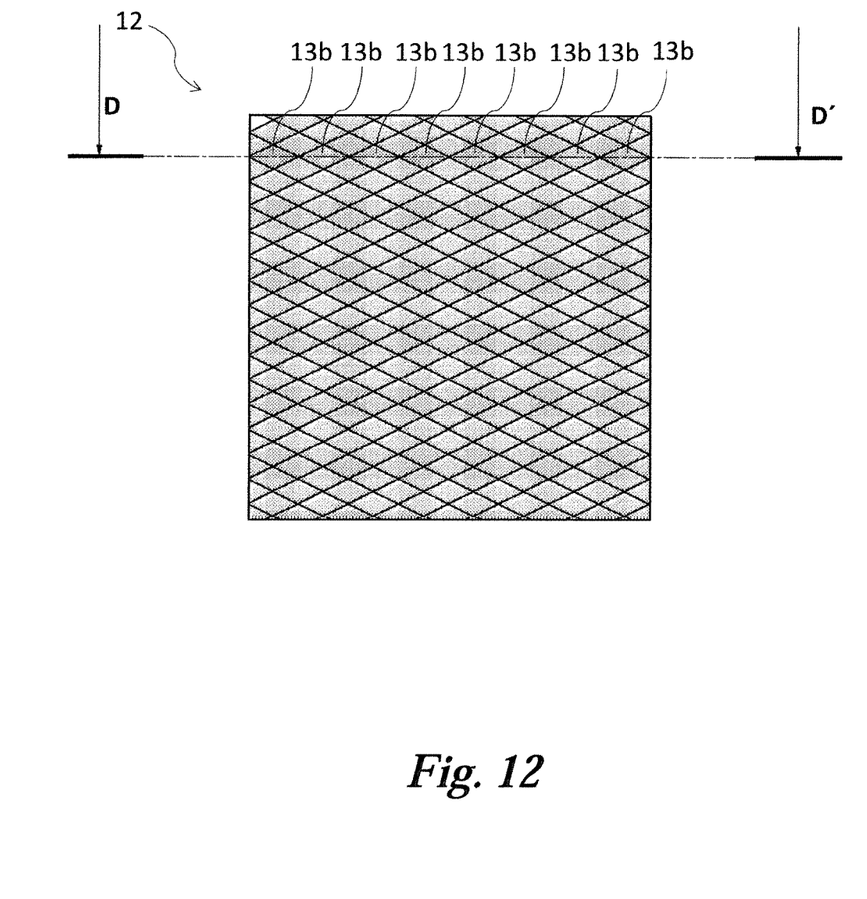
FIG. 12 is a front view of the output surface of an embodiment example of the active part of the optical component comprising divergent lenses.
Figure 13:
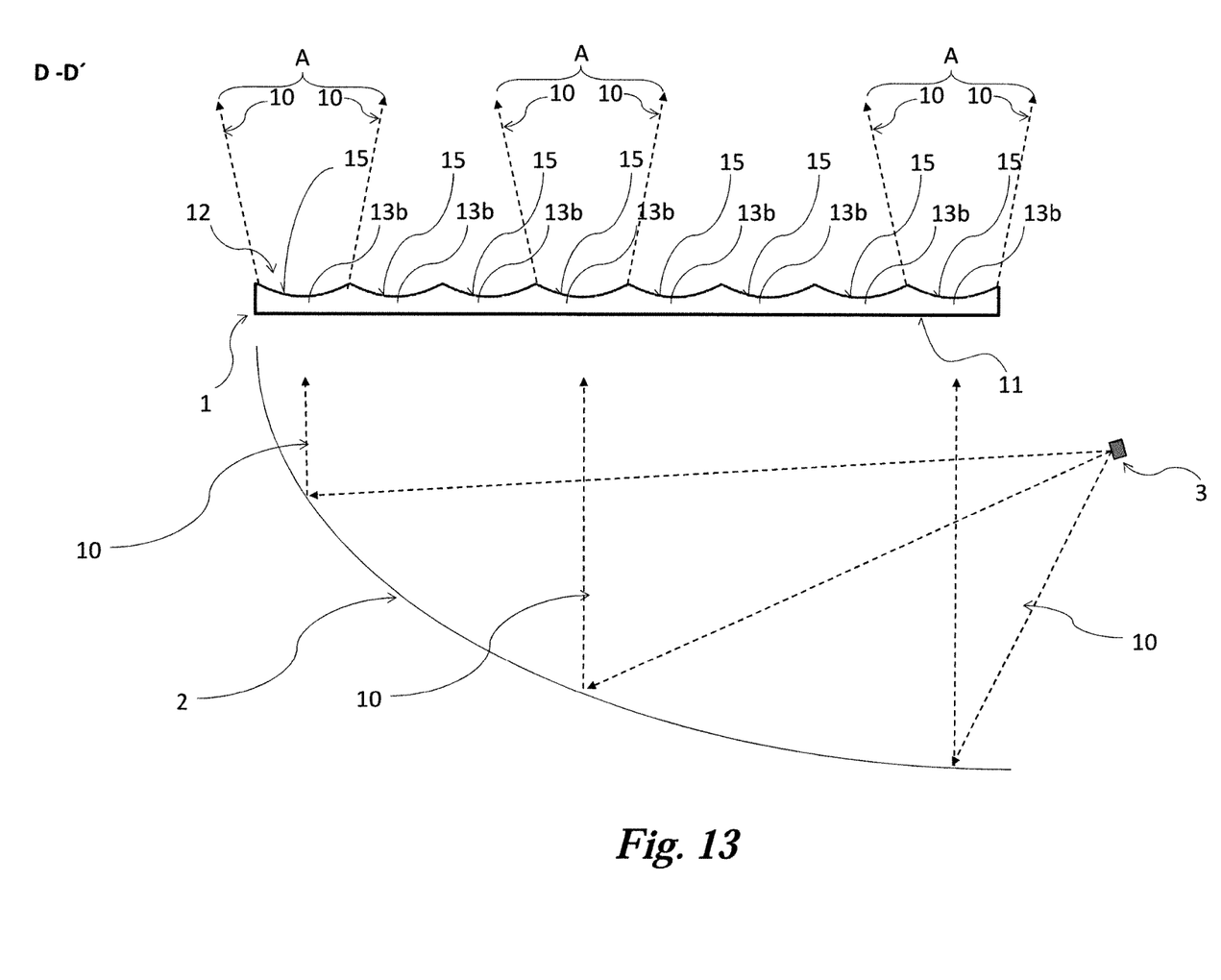
FIG. 13 is a view in the longitudinal section D-D' of the optical system of FIG. 12.

FIGS. 12 and 13 show another exemplary embodiment wherein the active part 1 of the optical component comprises on its output surface 12 optical elements 13 arranged next to each other and designed as divergent lenses 13b. Light rays 10 are generated by the light unit 3 and collimated by the collimating element 2, which is a parabolic reflector.

LIST OF REFERENCE MARKS

1—active part (of the optical component)
11—input surface (of the active part)
12—output surface (of the active part)
13—optical element
13a—convergent lens
13b—divergent lens
15—output surface
16—contact point
17—inactive surface
18—margin
2—collimating element
21—input surface (of the collimating element)
22—output surface (of the collimating element)

3—light unit
30—optical system
31—lens
32—focal point
10, 10'—light ray
A—light pattern
X, Y, Z—axes of the Cartesian coordinate system
ZY—display surface

The invention claimed is:

1. An optical system for a motor vehicle for lighting under conditions of reduced visibility comprising an optical component with an active part made of an optically transparent material, a collimating element and a light unit to emit light rays to the collimating element to collimate the light rays and to direct the light rays to the active part,
- wherein the active part has an output surface on a front side for the output of the light rays out of the active part towards a display surface situated at a distance in front of the active part,
- wherein the active part comprises optical elements consisting of convergent lenses and/or divergent lenses that:
  (i) are arranged side by side in rows that are situated next to each other,
  (ii) have individual output surfaces being part of the output surface and having a rhombic shape in the front view of the output surface, wherein the rhombic shape comprises longer diagonals that lie on horizontal planes passing through optical centers of the convergent lenses and/or the divergent lenses, wherein the longer diagonals of all the rhombic shapes being mutually parallel, and
  (iii) are configured to create mutually overlapping individual light patterns of a rhombic shape on the display surface, wherein individual light patterns together compose a resulting light trace of a substantially rhombic shape on the display surface.

2. The optical system according to claim 1, wherein the output surface entirely covers the front side of the active part in the front view of the output surface.

3. The optical system according to claim 1, wherein the active part of the optical component comprises exclusively spherical lenses or exclusively aspherical lenses or a combination of spherical and aspherical lenses.

4. The optical system according to claim 1, wherein the active part of the optical component comprises exclusively convergent lenses or exclusively divergent lenses or an arrangement of convergent lenses and divergent lenses.

5. The optical system according to claim 1, wherein all the lenses have the same circumferential shape and the same size in the front view of the output surface.

6. The optical system according to claim 1, wherein the convergent lenses and/or the divergent lenses have the same focal distance.

7. The optical system according to claim 1, wherein the active part comprises convergent lenses and divergent lenses of the same rhombic shape and size, and each couple of adjacent lenses includes one convergent lens and one divergent lens.

8. The optical system according to claim 1, wherein the active part of the optical component has a plate-like shape.

9. The optical system according to claim 8, wherein the active part of the optical component has substantially the shape of a planar plate.

10. The optical system according to claim 8, wherein the active part of the optical component substantially has the shape of a convex or concave plate.

11. The optical system according to claim 1, wherein the active part and collimating element form an integral body.

12. The optical system according to claim 1, wherein the active part and the collimating element are independent, spatially separated bodies.

13. The collimating system according to claim 12, wherein the collimating element is a parabolic reflector.

* * * * *